(12) United States Patent
Nakanishi

(10) Patent No.: US 8,508,724 B2
(45) Date of Patent: Aug. 13, 2013

(54) METHOD OF MEASURING CUTOFF WAVELENGTH

(75) Inventor: Tetsuya Nakanishi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/454,382

(22) Filed: Apr. 24, 2012

(65) Prior Publication Data

US 2012/0274928 A1  Nov. 1, 2012

(30) Foreign Application Priority Data

Apr. 27, 2011 (JP) .................. 2011-099486

(51) Int. Cl.
*G01N 21/00* (2006.01)

(52) U.S. Cl.
USPC ........................................................ 356/73.1

(58) Field of Classification Search
USPC ........................................................ 356/73.1
See application file for complete search history.

(56) References Cited

U.S. PATENT DOCUMENTS

| | | | | |
|---|---|---|---|---|
| 4,576,485 A | * | 3/1986 | Lambert | 374/130 |
| 4,657,388 A | * | 4/1987 | Coppa et al. | 356/73.1 |
| 4,714,343 A | * | 12/1987 | Ide | 356/73.1 |

OTHER PUBLICATIONS

International Telecommunication Union, ITU-T G.650.1, Series G: Transmission Systems and Media, Digital Systems and Networks, "Definitions and test methods for linear, deterministic attributes of single-mode fibre and cables," Jul. 2010, pp. 22-30, 58-60.
Louis-Anne de Montmorillon et al., "All-Solid G.652.D Fiber with Ultra Low Bend Losses Down to 5 mm Bend Radius," OTuL3, OSA/OFC/NFOEC, 2009.
R. Morgan et al., "Wavelength dependence of bending loss in monomode optical fibers: effect of the fiber buffer coating," Optics Letter, Sep. 1, 1990, pp. 947-949, vol. 15, No. 17.
Louis-Anne de Montmorillon et al., "Cutoff Mechanisms in Bend-Insensitive Single-Mode Fibers," OTuA1, OSA/OFC/NFOEC, 2011.

* cited by examiner

*Primary Examiner* — Tu Nguyen
(74) *Attorney, Agent, or Firm* — Drinker Biddle & Reath LLP

(57) ABSTRACT

A method for accurately measuring the cutoff wavelength of a high order mode of an optical fiber includes a first step of measuring power spectrum $P1(\lambda)$ of light output from a light source; a second step of measuring power spectrum $P2(\lambda)$ of light emitted from one end of a test fiber when light output from the light source is made incident on the other end of the test fiber placed in a form (preferably spiral) allowing the curvature to vary in the longitudinal direction thereof; a third step of obtaining difference spectrum $P(\lambda)$ representing the difference between the power spectrum $P2(\lambda)$ and the power spectrum $P1(\lambda)$; and a fourth step of obtaining the cutoff wavelength of a high order mode of the test fiber on the basis of the difference spectrum $P(\lambda)$.

7 Claims, 6 Drawing Sheets

METHOD OF MEASURING CUTOFF WAVELENGTH

FIELD OF THE INVENTION

The present invention relates to a method of measuring a cutoff wavelength of a high order mode of an optical fiber.

BACKGROUND ART

It is important that an optical fiber used as an optical transmission line in an optical communications system be a single mode at a signal light wavelength and that the cutoff wavelength of a high order mode be shorter than the signal light wavelength. The cutoff wavelength of a high order mode is defined as a wavelength at which the attenuation due to bend loss of the high order mode is 19.37 dB. In ITU-T G.650.1, a bend reference method and a multimode reference method are indicated as a method of measuring the cutoff wavelength of a high order mode of an optical fiber.

L.-A. de Montmorillon et al., OTuL3,OFC 2009 (Literature 1) describes a bend-insensitive fiber which has a refractive-index distribution having a trench form in a cladding and in which light will not easily leak out even when it is bent with a small radius of curvature. It has been difficult to correctly measure a cutoff wavelength of such optical fiber by a conventional test method for cut-off wavelength.

R. Morgan et al., Opt. Lett., Vol. 15 (1990), No. 17, 947 (Literature 2) indicates that a spectrum called "whispering gallery mode" (WGM) occurs when a part of light which has leaked from a core is reflected at an interface having a large refractive-index-difference, for example, between glass and coating layer or between air and coating layer, and causes interference with light propagating through the core.

SUMMARY OF THE INVENTION

The object of the present invention is to provide a method for accurately measuring the cutoff wavelength of a high order mode of an optical fiber.

To achieve the object, the method of measuring the cutoff wavelength of a high order mode of a test fiber comprises: a first step of measuring power spectrum $P1(\lambda)$ [dB] of light output from a light source; a second step of measuring power spectrum $P2(\lambda)$ [dB] of light emitted from one end of the test fiber when light output from the light source is made incident on the other end of the test fiber that is placed in a form which allows the curvature to vary in the longitudinal direction thereof; a third step of obtaining difference spectrum $P(\lambda)$ representing the difference between the power spectrum $P2(\lambda)$ and the power spectrum $P1(\lambda)$; and fourth step of obtaining the cutoff wavelength of a high order mode of the test fiber on the basis of the difference spectrum $P(\lambda)$.

In the method of the present invention for measuring a cut-off wavelength, the fourth step may include: a first sub-step of obtaining an approximate expression: $a\lambda+b$[dB], which expresses a straight line portion (of the difference spectrum $P(\lambda)$) extending in the direction of larger wavelength side from a point at which the difference spectrum $P(\lambda)$ is the minimum; and a second sub-step of obtaining the cutoff wavelength of a high order mode of the test fiber on the basis of a wavelength which falls at a point where the difference spectrum $P(\lambda)$ intersects with a straight line expressed by an expression: $a\lambda+b+0.1$ [dB].

At the second step, (1) a form which allows the curvature to vary in the longitudinal direction may be spiral, and (2) the form preferably has a minimum curvature and a maximum curvature such that the oscillatory wave form of a difference spectrum $P(\lambda)$min shifts, by half a cycle or more relative to the oscillatory wave form of a difference spectrum $P(\lambda)$max, in a wavelength range for measuring the power spectrum $P2(\lambda)$, whereas the difference spectrum $P(\lambda)$min is obtainable when the whole length of the test fiber is wound with the minimum curvature and the difference spectrum $P(\lambda)$max is obtainable when the whole length of the test fiber is wound with the maximum curvature.

It is preferable that positioning of the test fiber at the second step be done such that the bend loss (increase in loss on the basis of a loss in the state where the full length of the fiber is wound with a diameter of 280 mm) is 0.1 dB or less at the cutoff wavelength of LP11 mode which propagates through the test fiber. In the method of the present invention for measuring a cut-off wavelength, preferably the bend loss of the test fiber is 0.5 dB/turn or less, and more preferably 0.08 dB/turn or less, with a radius of curvature of 7.5 mm at the wavelength of 1550 nm.

Effect of the Invention

According to the present invention, it is possible to accurately measure the cutoff wavelength of a high order mode of an optical fiber.

MODE FOR CARRYING OUT THE INVENTION

Figure 1:
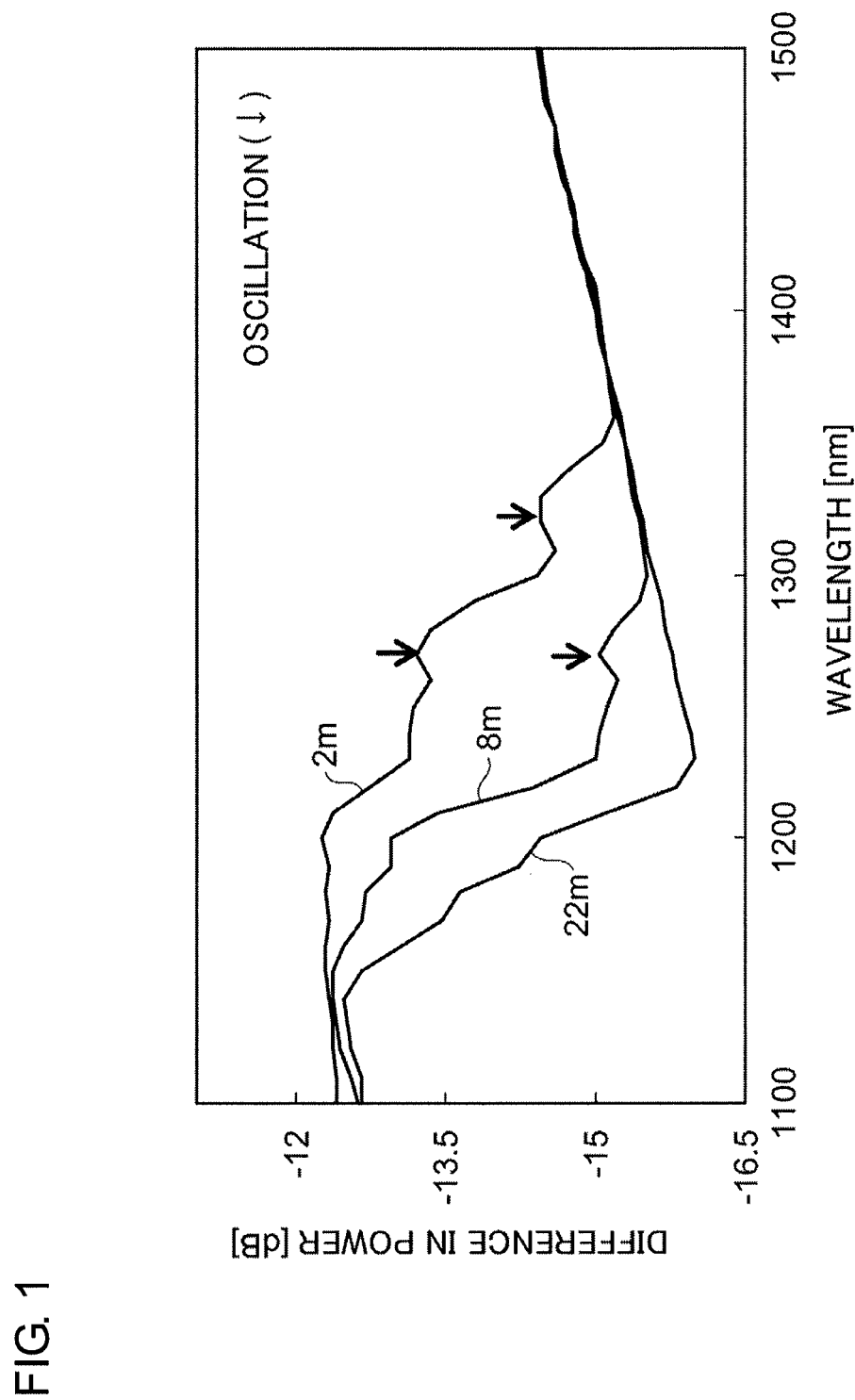
FIG. 1 is a graph showing a difference spectrum obtained by a method of measuring a cut-off wavelength in a comparative example.

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted. The dimensional ratios in the drawings are not always exact.

First, a conventional method for measuring a cut-off wavelength using the multimode reference method (comparative example) will be described. In the comparative example, an optical fiber used as a test fiber had the structure and characteristics shown in the following table.

TABLE

| Refractive index profile | Trench form |
|---|---|
| ITU-T Category | G.637.B3 |
| MFD @1310 nm | 8.6 μm |
| Cable cutoff wavelength | 1230 nm |
| Bend loss @R = 5 mm, λ = 1550 nm | 0.06 dB/turn |

This test fiber is a bend-insensitive fiber with a refractive-index profile having a trench in the cladding as indicated in Literature 1 and is designed so that light will not leak out easily even if the optical fiber is bent with a small radius of curvature.

In the comparative example, first of all, a test fiber was inserted between a first multimode fiber and a second multimode fiber, and light output from a wavelength variable light source was made incident on the first multimode fiber, and then the power spectrum P1(λ) of light emitted from the second multimode fiber was measured. For the purpose of such measurement, the length of the test fiber was 2 m, 8 m, or 22 m, and the portion excluding a 0.5 m length from each end thereof was wound around the circumference of a mandrel having a diameter of 280 mm.

Next, a third multimode fiber was inserted between the first multimode fiber and the second multimode fiber, and light output from the wavelength variable light source was made incident on the first multimode fiber, and then the power spectrum P2(λ) of light emitted from the second multimode fiber was measured. Subsequently, the difference spectrum P(λ) representing the difference between the power spectrum P2(λ) and the power spectrum P1(λ) was obtained. Thus, the cutoff wavelength of a high order mode of the test fiber can be obtained based on the difference spectrum P(λ).

FIG. 1 is a graph showing difference spectra obtained by the method of measuring a cut-off wavelength in a comparative example. There is a case where an oscillatory component appears in a difference spectrum P(λ) when a cutoff wavelength of a bend-insensitive fiber with a refractive-index profile having a trench in the cladding is about to be measured. Particularly, it remarkably appears in the difference spectrum P(λ) of a short optical fiber in which a high order mode tends to remain.

The inventor of this patent application has found that the oscillatory component that appears in a difference spectrum P(λ) is due to WGM in a high order mode. In many cases, the diameter of a mandrel around which a test fiber is wound for measuring a cutoff wavelength is relatively large: 80 mm to 280mm. In such a case, since the incidence angle (reflection angle) is nearly 90° at a point where the refractive index of a test fiber changes, the reflectance becomes large in accordance with the Fresnel formula, even if the refractive-index difference is small. Consequently, in many cases, the reflection of light occurs not only at an interface between a coating layer and air, but also at other place, such as an interface between the glass and coating layer which constitute the test fiber, or at a point where the refractive index is discontinuous in the glass of the test fiber.

The occurrence of WGM due to the refractive-index difference at the interface between a coating layer and air can be restrained by covering the circumference of the coating layer of a test fiber with an index-matching material as indicated in Literature 2. However, it is difficult to restrain the occurrence of WGM that is due to the refractive-index difference at the interface between glass and a coating layer. In the comparative example, WGM occurred, and accordingly it became difficult to correctly measure an attenuation caused by bend loss of the high order mode, and consequently it was difficult to exactly measure the cutoff wavelength of an optical fiber.

Therefore, in the embodiment of the method of the present invention for measuring a cut-off wavelength, the measurement is conducted by providing the following first to fourth steps and positioning a test fiber at the second step in a form such that the curvature thereof changes in the longitudinal direction.

Figure 2A:
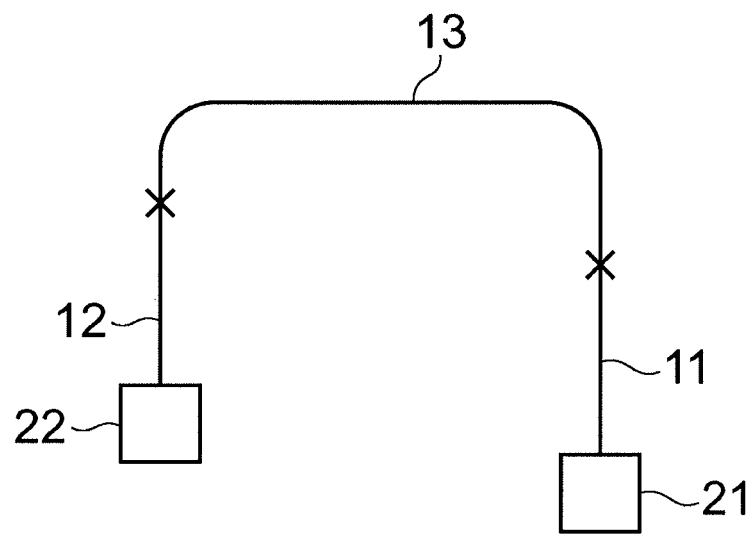
FIG. 2A is a conceptional schematic diagram showing the arrangement of an optical fiber at the first step in an embodiment of the present invention, and similarly
Figure 2B:
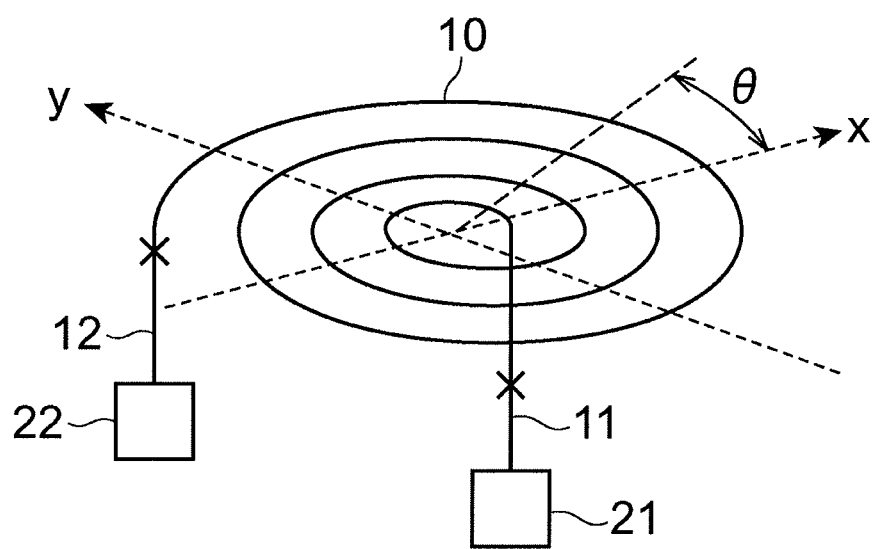
FIG. 2B is a conceptional schematic diagram showing the arrangement of the optical fiber at the second step.

FIG. 2A is a conceptional schematic diagram showing the arrangement of an optical fiber at the first step in an embodiment of the present invention, and similarly FIG. 2B is a conceptional schematic diagram showing the arrangement of the optical fiber at the second step. At the first step, under conditions where multimode fibers 11, 13, and 12 are optically connected in the enumerated order, light emitted from a light source 21 is made incident on an input end of the multimode fiber 11, and the power spectrum P1(λ) of light emitted from the multimode fiber 12 [dB] is measured with a power meter 22. At the second step, under conditions in which the multimode fiber 11, the test fiber 10, and the multimode fiber 12 are optically connected in the enumerated order, light output from the same light source 21 as the first step is made incident on the input end of the multimode fiber 11, and the power spectrum P2(λ) of light emitted from the multimode fiber 12 [dB] is measured with the power meter 22.

At the second step, the power spectrum P2(λ) is measured under conditions where the test fiber 10 is placed in a form in which the curvature thereof changes in a longitudinal direction. The form is preferably a spiral, which is helpful as a method for changing the curvature of the test fiber in the longitudinal direction without failure.

The light source 21 used at the first step and the second step can output light at various wavelengths. Thus, by sweeping a wavelength of light output from the light source 21, power of light emitted at each wavelength from the test fiber 10 is measured with the power meter 22. The scope of variation in wavelength output by the light source 21 includes a wavelength which is assumed to be a cutoff wavelength of the test fiber 10. Either of the first step and the second step can be performed first.

At the third step, a difference spectrum P(λ) is obtained by subtracting a power spectrum P1(λ) from a power spectrum P2(λ). And at the fourth step, the cutoff wavelength of a high order mode of the test fiber is obtained on the basis of the difference spectrum P(λ).

Figure 3:
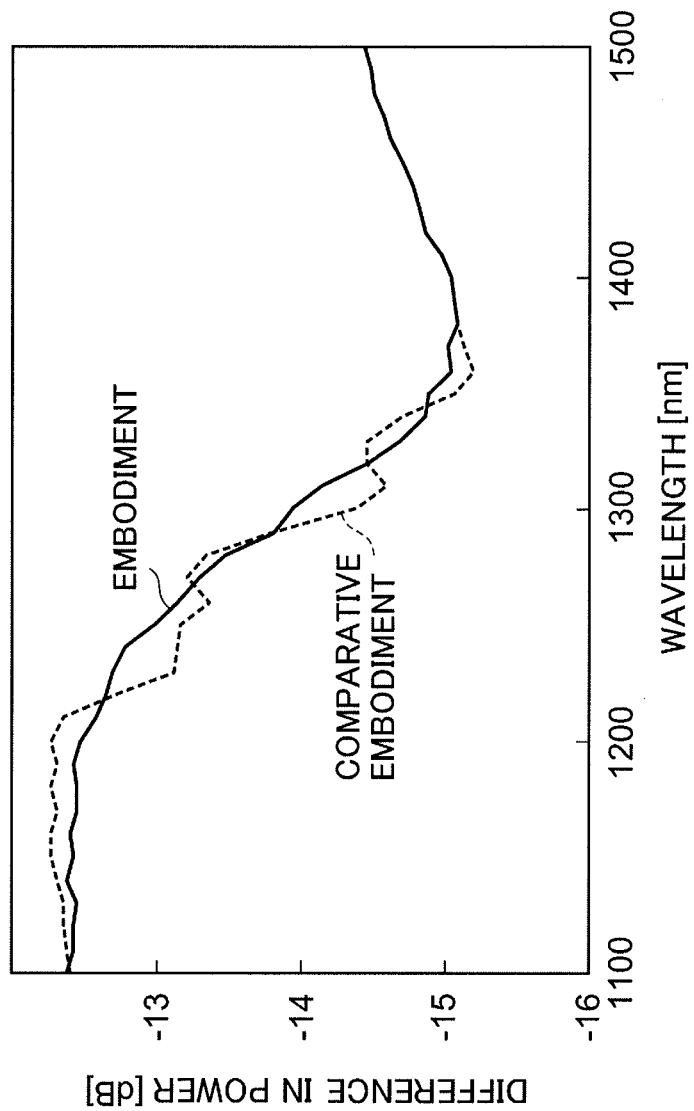
FIG. 3 is a graph showing difference spectrum $P(\lambda)$ in the method of measuring a cut-off wavelength according to one embodiment of the present invention and that of the comparative example: the solid line is a case of the embodiment; and the dashed line is a case of the comparative example.

FIG. 3 is a graph showing the difference spectrum P(λ) in the respective methods of measuring a cut-off wavelength according to one embodiment of the present invention and the comparative example: the solid line is a case of the embodiment; and the dashed line is a case of the comparative example. The test fiber used in the embodiment also has such structure and characteristics as shown in the Table. Oscillatory components due to WGM can be seen in the difference spectrum in the case of the comparative example, while oscillatory components are hardly seen in the difference spectrum in the case of the embodiment.

In the embodiment, the measurement is conducted by positioning a test fiber in a form in which the curvature changes in a longitudinal direction, so that the phase of oscillatory components can be changed at each position in the longitudinal direction such that the respective spectra cancel each other, whereby the amplitude of oscillatory components can be decreased. As a result, it is possible to accurately measure a cutoff wavelength of the test fiber by reducing the influence of the oscillatory components.

Figure 4A:
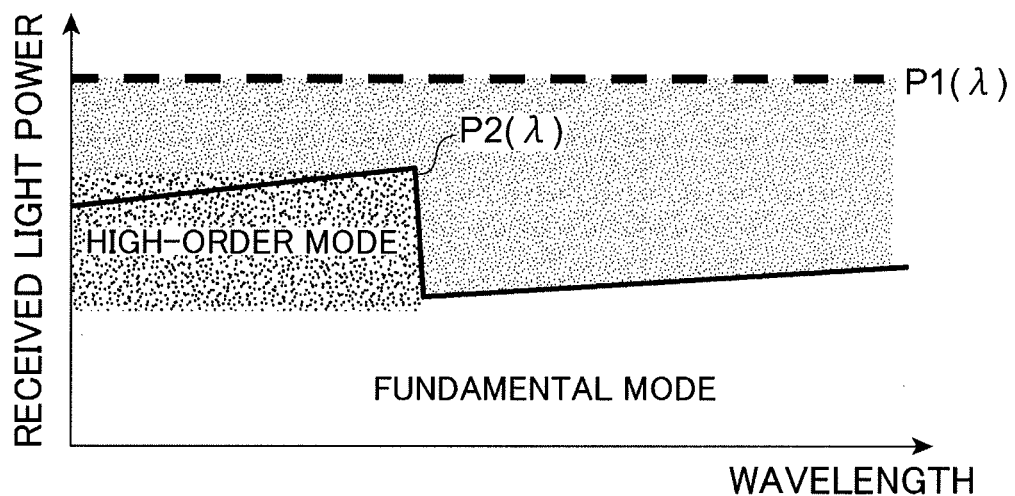
FIG. 4A is a graph showing power spectra $P1(\lambda)$ and $P2(\lambda)$ at the fourth step in the embodiment of the method for measuring a cut-off wavelength, and similarly
Figure 4B:
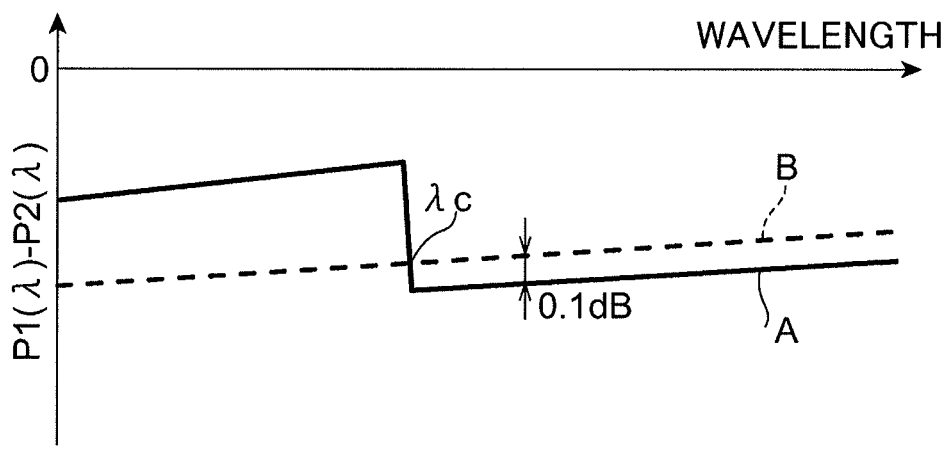
FIG. 4B is a graph showing difference spectra $P(\lambda)$.

FIG. 4A is a graph showing power spectra P1(λ) and P2(λ) at the fourth step in the embodiment of the method for measuring a cut-off wavelength, and similarly FIG. 4B is a graph showing difference spectra P(λ). The fourth step preferably comprises: a first sub-step of obtaining an approximate expression: aλ+b[dB], which approximates a straight line portion A (of the difference spectrum P(λ)) extending in the direction of larger wavelength side from a point at which the difference spectrum P(λ) is the minimum; and a second sub-step of obtaining the cutoff wavelength λc of a high order mode of the test fiber on the basis of a wavelength which falls at a point where the difference spectrum P(λ) intersects with a straight line (dashed line B) expressed by an expression: aλ+b+0.1 [dB].

In the following, an explanation about the arrangement of a test fiber at the second step will be given in more detail. It is desirable that a test fiber be positioned such that the oscillatory wave form of a difference spectrum P(λ)min shifts, by half a cycle or more relative to the oscillatory wave form of a difference spectrum P(λ)max, in a wavelength range in which the power spectrum P2(λ) is measured, whereas the difference spectrum P(λ)min is obtainable when the whole length of the test fiber is wound with the minimum curvature and the difference spectrum P(λ)max is obtainable when the whole length of the test fiber is wound with the maximum curvature. Thus, the amplitude of oscillatory components can securely be decreased by adjusting curvature distribution in the longitudinal direction of a test fiber so that an oscillating cycle may vary by half a cycle or more. It is more desirable that the test fiber be arranged such that an oscillating cycle changes by $2\pi$ or more in the longitudinal direction.

Figure 5:
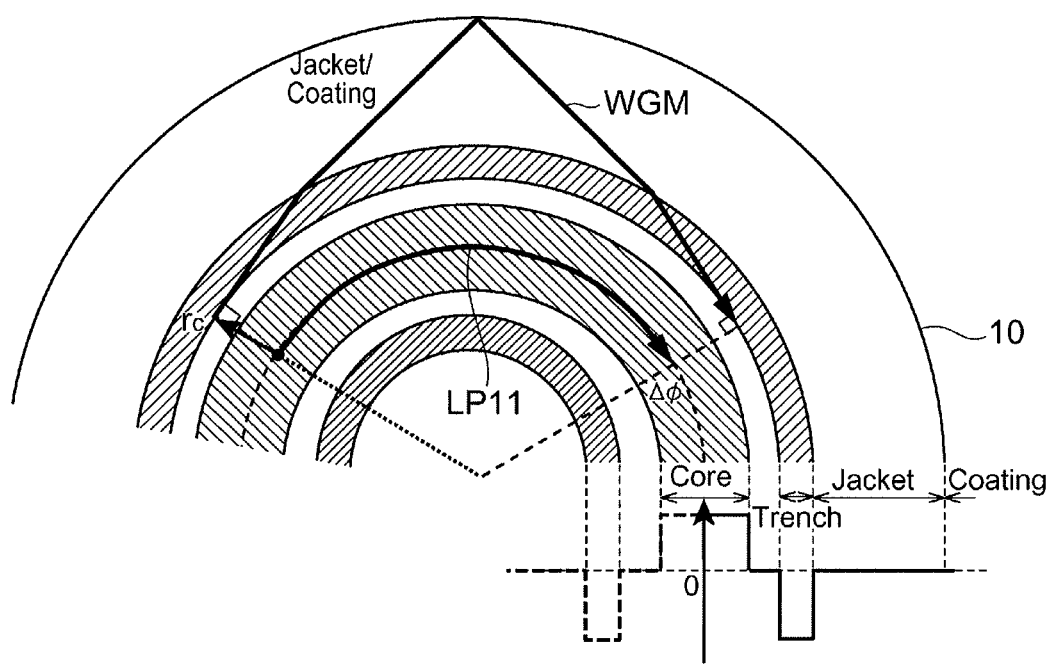
FIG. 5 is a conceptional schematic diagram illustrating an optical path of LP11 mode propagating through the core and an optical path of WGM reflected at the glass/coating interface in a test fiber with curvature.

FIG. 5 is a conceptional schematic diagram illustrating an optical path of LP11 mode propagating through the core and an optical path of WGM reflected at the glass/coating interface in a test fiber with curvature. A phase difference Aγ between LP11 mode guided through the core and WGM reflected at the glass/coating interface is expressed by Formula (1):

$$\Delta\phi = 2\pi L/\lambda - \beta Z \quad (1),$$

where λ is a wavelength, L is an optical path length of leakage light, β is a propagation constant of LP11 mode, and Z is an optical path length of light travelling through the core. The phase difference $\Delta\phi$ is a function of the wavelength λ.

The phase difference $\Delta\phi$ which determines the peak wavelength of an oscillatory component can be adjusted by changing the bend radius so as to change L and Z. For suppressing oscillatory components in order to measure an exact cutoff wavelength, a suitable arrangement of a test fiber can be achieved in a manner as follows: first, calculate the relationship between $\Delta\phi$ and the bend radius at a wavelength which is assumed to be a cutoff wavelength (hereinafter, "assumed cutoff wavelength"); next, determine the arrangement of the test fiber so that $\Delta\phi$ at the assumed cutoff wavelength may change $2\pi$ or more at least at a part between the incidence and output ends of the test fiber.

It is advisable to adopt a spiral form as a suitable arrangement of a test fiber, for example. In the case where the test fiber having the structure and characteristics shown in the Table is arranged in a spiral form as shown in FIG. 2B, each position (x, y) in the longitudinal direction of the test fiber can be expressed by Formulas (2a) and (2b):

$$X = a(\theta + \theta 0)\cos\theta [mm] \quad (2a)$$

$$Y = a(\theta + \theta 0)\sin\theta [mm] \quad (2b)$$

In the case where a test fiber was arranged in a spiral form so that $\theta 0 = 2\pi$ and $a=1$ in Formulas (2a) and (2b), $\Delta\phi$ changed by approximately π in the longitudinal direction of the test fiber when $\Delta\phi$ was obtained from Formula (1) by substituting the optical path length Z of LP11 mode propagating through the core and the optical path length L of WGM reflected at a glass/coating interface, whereas the optical path lengths Z and L were geometrically calculated from FIG. 5. In such case, it was possible to restrain the power of the oscillatory components to 1/5 or less as compared with the conventional measuring method. Thus, it is possible to predict the change of $\Delta\phi$ in the longitudinal direction by choosing such a spiral form, and consequently to determine a suitable arrangement of the test fiber.

The values of $\theta 0 = 2\pi$ and $a=1$ in the above case were determined so that $\Delta\phi$ would be approximately equal to π. However, such values will change according to the diameter and refractive-index profile of a test fiber. Therefore, it is preferable to appropriately change the spiral form according to conditions of the test fiber. Note, however, that it is not always necessary to arrange in a form that is exactly spiral; any form will be acceptable as long as the arrangement of the test fiber is such that $\Delta\phi$ will change by one half-cycle in the longitudinal direction.

When $\Delta\phi$ is changed by π or more at an assumed cutoff wavelength, at the same time the wavelength spacing of peak wavelengths of oscillatory components will be changed. In such case, oscillatory components can also be controlled by changing $\Delta\phi$ by π or more at the assumed cutoff wavelength. More simply, it is sufficient if the spiral form of the test fiber is determined so that the waveform of an oscillatory component at an assumed cutoff wavelength may be reversed to positive or negative once or more. Here, the assumed cutoff wavelength may differ from the actual measurement as long as the difference is about ±50 nm or less.

Moreover, it is desirable to determine the positioning of a test fiber at the second step in a manner such that the bend loss at the cutoff wavelength of LP11 mode of light propagating through the test fiber will become 0.1 dB or less. If the bend loss of LP11 mode of the test fiber becomes more than 0.1 dB at the cutoff wavelength because of a curvature afforded at the second step, such bend loss will be added to the inherent loss of LP11 mode, whereby an error will be caused in the measurement of the cutoff wavelength.

Figure 6:
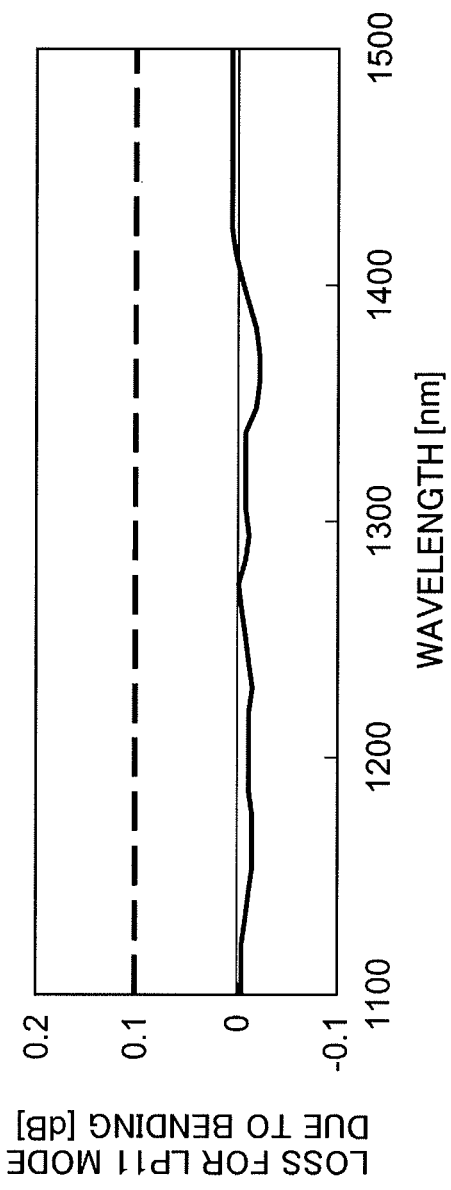
FIG. 6 is a graph showing the wavelength dependence of the bend loss of a test fiber.

FIG. 6 is a graph showing the wavelength dependence of the bend loss of a test fiber. In this case, the test fiber had the structure and characteristics shown in the Table and was arranged in a spiral form as shown in FIG. 2B. In such case, the parameters of the above-mentioned Formulas (2a) and (2b) were $\theta 0 = 2\pi$ and $a=1$. Thus, measurement of an exact cutoff wavelength is enabled by making the arrangement of a test fiber while fully changing $\Delta\phi$ in a longitudinal direction in a manner such that no extra bend loss will be caused by changing the curvature in the longitudinal direction.

In the case of a bend-insensitive optical fiber which has an expedient to keep the bend loss small as described in L.-A. de Montmorillon et al., OTuA1, OFC 2011, the wavelength dependence of a high order mode loss occasionally becomes small. In such case, it is suitable to measure a cutoff wavelength with the method of the present invention for measuring a cut-off wavelength, since there is a case where the interference of a high order mode is large and accordingly oscillatory components become large.

In the case of an optical fiber with a refractive-index distribution profile having a trench in the cladding and which is designed to have a bend loss of 0.5 dB/turn or less at a wavelength of 1550 nm with a radius of curvature of 7.5 mm, a high order mode will be converted into a leaky mode near a cutoff wavelength, and accordingly the wavelength dependence of the high order mode loss will tend to become small.

Therefore, such fiber is particularly suitable for using the method of the present invention for measuring a cut-off wavelength. The method of the present invention for measuring a cut-off wavelength is more suitable for use particularly in an optical fiber which is designed to have a bend loss of 0.08 dB/turn or less with the radius of curvature of 7.5 mm at the 1550 nm wavelength, since in the case of such fiber, the wavelength dependence of the high order mode loss tends to become smaller when the high order mode becomes a leaky mode near a cutoff wavelength.

What is claimed is:

1. A method of measuring a cutoff wavelength of a high order mode of a test fiber, the method comprising:
    a first step of measuring power spectrum $P1(\lambda)$ [dB] of light output from a light source;
    a second step of measuring power spectrum $P2(\lambda)$ [dB] of light emitted from one end of the test fiber when light output from the light source is made incident on the other end of the test fiber placed in a form allowing the curvature to vary in the longitudinal direction;
    a third step of obtaining difference spectrum $P(\lambda)$ representing the difference between the power spectrum $P2(\lambda)$ and the power spectrum $P1(\lambda)$; and
    fourth step of obtaining the cutoff wavelength of the high order mode of the test fiber on the basis of the difference spectrum $P(\lambda)$.

2. The method for measuring the cutoff wavelength of the high order mode of the test fiber according to claim 1, wherein the fourth step includes:
    a first sub-step of obtaining an approximate expression: $a\lambda+b$[dB], the expression expressing a straight line portion (of the difference spectrum $P(\lambda)$) extending in the direction of larger wavelength side from a point at which the difference spectrum $P(\lambda)$ is the minimum; and
    a second sub-step of obtaining the cutoff wavelength of the high order mode of the test fiber on the basis of a wavelength falling at a point where the difference spectrum $P(\lambda)$ intersects with a straight line expressed by an expression: $a\lambda+b+0.1$ [dB].

3. The method for measuring the cutoff wavelength of the high order mode of the test fiber according to claim 1, wherein at the second step, the form allowing the curvature to vary in the longitudinal direction is spiral.

4. The method for measuring the cutoff wavelength of the high order mode of the test fiber according to claim 1, wherein at the second step, the form allowing the curvature to vary in the longitudinal direction has a minimum curvature and a maximum curvature such that the oscillatory wave form of a difference spectrum $P(\lambda)$min shifts, by half a cycle or more relative to the oscillatory wave form of a difference spectrum $P(\lambda)$max, in a wavelength range for measuring the power spectrum $P2(\lambda)$, whereas the difference spectrum $P(\lambda)$min is obtainable when the whole length of the test fiber is wound with the minimum curvature and the difference spectrum $P(\lambda)$max is obtainable when the whole length of the test fiber is wound with the maximum curvature.

5. The method for measuring the cutoff wavelength of the high order mode of the test fiber according to claim 1, wherein positioning of the test fiber at the second step is done such that the bend loss is 0.1 dB or less at a cutoff wavelength of LP11 mode propagating through the test fiber.

6. The method for measuring the cutoff wavelength of the high order mode of the test fiber according to claim 1, wherein the bend loss of the test fiber is 0.5 dB/turn or less with a radius of curvature of 7.5 mm at the wavelength of 1550 nm.

7. A method of measuring a cutoff wavelength of a high order mode of a test fiber, the method comprising:
    a first step of measuring power spectrum $P1(\lambda)$ [dB] of light output from a light source;
    a second step of measuring power spectrum $P2(\lambda)$ [dB] of light emitted from one end of the test fiber when light output from the light source is made incident on the other end of the test fiber placed in a form allowing the curvature to vary in the longitudinal direction;
    a third step of obtaining difference spectrum $P(\lambda)$ representing the difference between the power spectrum $P2(\lambda)$ and the power spectrum $P1(\lambda)$; and
    fourth step of obtaining the cutoff wavelength of the high order mode of the test fiber on the basis of the difference spectrum $P(\lambda)$, wherein
    at the second step, the form allowing the curvature to vary in the longitudinal direction is spiral and has a minimum curvature and a maximum curvature such that the oscillatory wave form of a difference spectrum $P(\lambda)$min shifts, by half a cycle or more relative to the oscillatory wave form of a difference spectrum $P(\lambda)$max, in a wavelength range for measuring the power spectrum $P2(\lambda)$, whereas the difference spectrum $P(\lambda)$min is obtainable when the whole length of the test fiber is wound with the minimum curvature and the difference spectrum $P(\lambda)$max is obtainable when the whole length of the test fiber is wound with the maximum curvature.

* * * * *